United States Patent
Rehman et al.

(10) Patent No.: US 10,554,456 B2
(45) Date of Patent: Feb. 4, 2020

(54) CIRCUITS AND METHODS FOR BI-DIRECTIONAL DATA COMMUNICATION OVER ISOLATION CHANNELS

(71) Applicant: SEMICONDUCTOR COMPONENTS INDUSTRIES, LLC, Phoenix, AZ (US)

(72) Inventors: Syed Enam Rehman, Milpitas, CA (US); John Constantino, Morgan Hill, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/102,910

(22) Filed: Aug. 14, 2018

(65) Prior Publication Data

US 2019/0068417 A1    Feb. 28, 2019

Related U.S. Application Data

(63) Continuation of application No. 62/549,122, filed on Aug. 23, 2017.

(51) Int. Cl.
*H04L 27/04* (2006.01)
*H04L 27/06* (2006.01)
(Continued)

(52) U.S. Cl.
CPC ............ *H04L 27/04* (2013.01); *H04B 3/32* (2013.01); *H04L 25/0272* (2013.01);
(Continued)

(58) Field of Classification Search
CPC .............................................. H04L 25/03057
(Continued)

(56) References Cited

U.S. PATENT DOCUMENTS 6,021,158 A * 2/2000 Schurr ................. H04L 1/0003
375/211
6,137,839 A * 10/2000 Mannering ........... H04L 1/0003
370/210

(Continued)

FOREIGN PATENT DOCUMENTS

WO    2014036594 A1    3/2014

OTHER PUBLICATIONS

Extended European Search Report for European Application No. 18190121.6, dated Mar. 27, 2019, 13 pages.
(Continued)

*Primary Examiner* — Juan A Torres
(74) *Attorney, Agent, or Firm* — Brake Hughes Bellermann LLP

(57) ABSTRACT

In a general aspect, a data communication circuit can include a transmitter configured to transmit a first digital bit stream via a first unidirectional isolation channel. The data communication circuit can further include a receiver configured to receive a second digital bit stream via a second unidirectional isolation channel. The first unidirectional isolation channel and the second unidirectional isolation channel can be defined on a common dielectric substrate. The data communication circuit can further include a crosstalk suppression circuit configured to provide at least one negative feedback signal to suppress crosstalk between the transmitter and the receiver due to parasitic capacitive coupling between the first unidirectional isolation channel and the second unidirectional isolation channel in the common dielectric substrate.

17 Claims, 11 Drawing Sheets

(51) Int. Cl.
*H04L 25/02* (2006.01)
*H04L 27/20* (2006.01)
*H04B 3/32* (2006.01)
*G06F 13/42* (2006.01)

(52) U.S. Cl.
CPC .......... *H04L 27/06* (2013.01); *H04L 27/2071* (2013.01); *G06F 13/4282* (2013.01)

(58) Field of Classification Search
USPC .................................................. 375/233, 295
See application file for complete search history.

(56) References Cited

U.S. PATENT DOCUMENTS

| | | | | |
|---|---|---|---|---|
| 6,385,235 | B1* | 5/2002 | Scott | H04L 25/0266 375/220 |
| 7,915,935 | B1* | 3/2011 | Menon | H03L 7/18 327/159 |
| 9,735,112 | B2 | 8/2017 | Constantino et al. | |
| 2009/0027243 | A1 | 1/2009 | Leung et al. | |
| 2009/0213914 | A1 | 8/2009 | Dong et al. | |
| 2010/0054345 | A1 | 3/2010 | Yamamoto | |
| 2010/0190357 | A1 | 7/2010 | Hashim | |
| 2011/0011934 | A1* | 1/2011 | Iwamura | G06K 19/0701 235/435 |
| 2011/0069604 | A1* | 3/2011 | Schmukler | H03H 11/265 370/201 |
| 2013/0301690 | A1 | 11/2013 | Shrestha | |
| 2015/0200162 | A1 | 7/2015 | Constantino et al. | |

OTHER PUBLICATIONS

Partial Search Report and Invitation to Pay Further Search Fee for European Application No. 18190121.6, dated Dec. 18, 2018, 15 pages.

Extended European Search Report for European Application No. 18190009.3, dated Nov. 29, 2018, 7 pages.

* cited by examiner

CIRCUITS AND METHODS FOR BI-DIRECTIONAL DATA COMMUNICATION OVER ISOLATION CHANNELS

RELATED APPLICATION

This application claims priority to and the benefit of U.S. Provisional Application No. 62/549,122, filed Aug. 23, 2017, which is hereby incorporated by reference in its entirety.

TECHNICAL FIELD

This description relates to circuits for communicating data between galvanically (e.g., capacitively) isolated circuits.

BACKGROUND

Communication of data, such as control, feedback and status information, in automotive and industrial applications or electrical systems can include communicating data between different power domains, where such power domains can have substantial differences in voltages used in those power domains (e.g., tens of thousands of volts in some implementations). For instance, a first data communication circuit, in a first power domain, can communicate data to a second data communication circuit, in a second power domain. In such applications, in order to prevent (block, etc.) stray currents, such as currents due to ground potential differences and/or currents from alternating-current (AC) power from passing between the first data communication circuit and the second data communication circuit (e.g., between the different power domains), the first data communication circuit and the second data communication circuit can be galvanically (e.g., capacitively) isolated, with data being communicated between the data communication circuits via the galvanic isolation. Current approaches for implementing galvanic isolation, however, have certain drawbacks, such as low breakdown voltages, crosstalk between isolation channels, data communication latency and/or signal distortion that can cause corrupted data.

SUMMARY

In a general aspect, a data communication circuit can include a transmitter configured to transmit a first digital bit stream via a first unidirectional isolation channel. The data communication circuit can further include a receiver configured to receive a second digital bit stream via a second unidirectional isolation channel. The first unidirectional isolation channel and the second unidirectional isolation channel can be defined on a common dielectric substrate. The data communication circuit can further include a crosstalk suppression circuit configured to provide at least one negative feedback signal to suppress crosstalk between the transmitter and the receiver due to parasitic capacitive coupling between the first unidirectional isolation channel and the second unidirectional isolation channel in the common dielectric substrate.

DETAILED DESCRIPTION

This disclosure is directed to circuits, devices and methods for bi-directional communication of data for multiple (bi-directional) data channels using unidirectional galvanically isolated channels (e.g., two unidirectional differential isolation channels). The approaches described herein can be used for data communication between different power domains, such as in industrial and or automotive applications, including power conversion, gate drivers, motor control, etc. For instance, data can be communicated from a first (e.g., primary, master, etc.) data communication circuit (e.g., in a first power domain) to a second (e.g., secondary, slave, etc.) data communication circuit (e.g., in a second power domain) using a first unidirectional isolation channel, while data from the second data communication circuit to the first data communication circuit can be communicated using a second unidirectional isolation channel. The data communicated on each of the unidirectional isolation channels can be in the form of respective serialized bit streams that include data corresponding with multiple bi-directional data channels. In some implementations the serialized bit streams can be encoded bit streams, such as Manchester encoded bit streams.

In the approaches described herein, galvanic isolation between data communication circuits (and associated power domains) can be achieved using a plurality of capacitors defined on a common dielectric substrate, such as a printed circuit substrate (e.g., ceramic, FR4, etc.). For instance, capacitors can be defined on the substrate for each of two unidirectional differential isolation channels (e.g., four total capacitors, including one for each of the positive differential signals and one for each of the negative differential signals). Using the circuits, devices and methods described herein, high distance through insulation can be achieved due to the thickness of the substrate used to implement the isolation capacitors, crosstalk between unidirectional channels can be suppressed, low latency data transmission can be achieved, and adverse effects of variations in signals used to communicate data between data communication circuits (e.g., due to differences in material properties, manufacturing variations, etc.) can be reduced.

Figure 1:
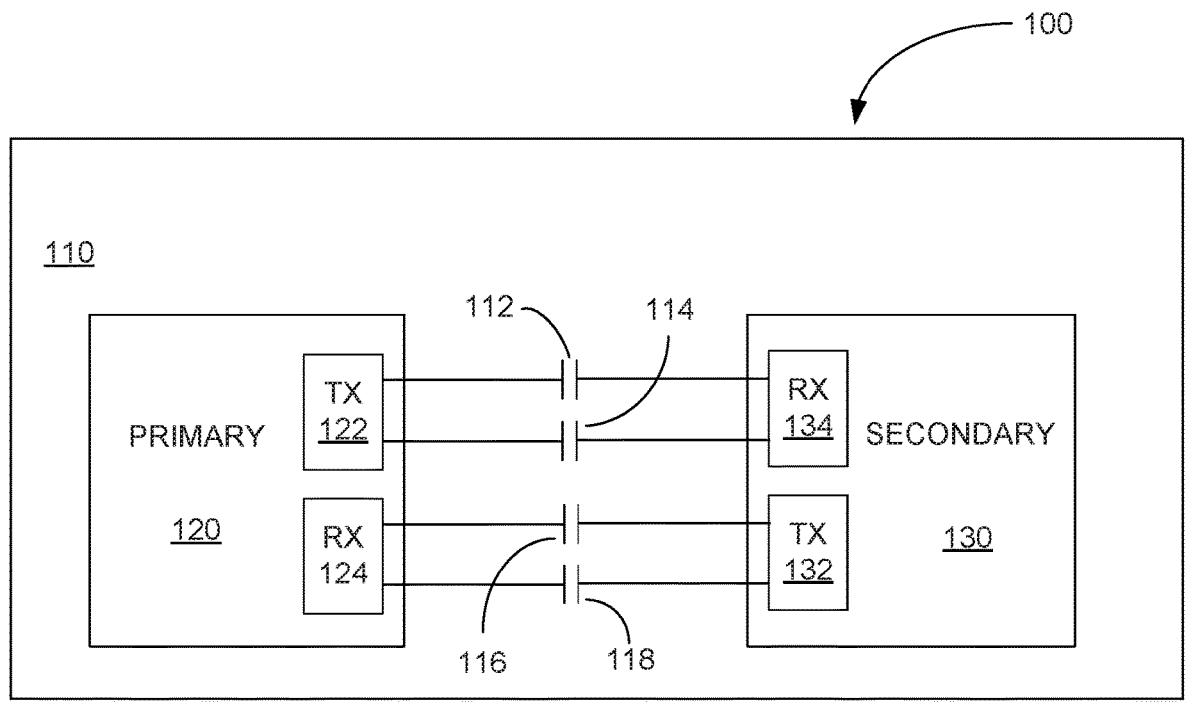
FIGS. 1 and 2 are block diagrams illustrating data communication devices.

FIG. 1 is a block diagram illustrating a data communication device 100. As shown in FIG. 1, the data communication device 100 includes a substrate 110, a primary (first, etc.) data communication circuit 120 and a secondary (second, etc.) data communication circuit 130. The substrate 110 can be a printed circuit substrate, such as a ceramic substrate, an FR4 substrate, or any appropriate substrate material having dielectric (electrical insulation) properties. The primary data communication circuit 120 and the secondary communication circuit 130 can be implemented on respective integrated circuits (ICs). The primary data communication circuit 120 (e.g., a first IC) and the secondary communication circuit 130 (e.g., a second IC), as shown in FIG. 1, can be disposed on (coupled with, etc.) the substrate 110. Further, the primary data communication circuit 120 and the secondary data communication circuit 130 can be electrically coupled with capacitor pairs included on the substrate 110 using circuit traces and/or conductive vias included on the substrate 110, as well as using flip-chip solder connections and/or wire bonds between the respective ICs and the substrate 110.

As shown in FIG. 1, capacitor pairs for two unidirectional isolation channels can be defined (formed, implemented, etc.) on the substrate 110. For instance, in the device 100, a first capacitor pair can include capacitors 112 and 114, and a second capacitor pair can include capacitors 116 and 118. The capacitors 112-118 can be formed using respective capacitor electrodes disposed on opposite sides of the substrate 110. In the device 100, a first unidirectional isolation channel can include the first capacitor pair (including the capacitors 112 and 114), while a second unidirectional isolation channel can include the second capacitor pair (including the capacitors 116 and 118). The first and second unidirectional isolation channels can be used for bi-directional data communication (e.g., between two different power domains).

As shown in FIG. 1, the primary data communication circuit 120 includes a transmitter (TX) 122 and a receiver (RX) 124, while the secondary data communication circuit includes a TX 132 and a RX 134. In the device 100, the capacitors 112 and 114 can provide differential series coupling between the TX 122 of the primary data communication circuit 120 and the RX 134 of the secondary data communication circuit 130. The capacitors 116 and 118 can provide differential series coupling between the TX 132 of the secondary data communication circuit 130 and the RX 124 of the primary data communication circuit 120.

In the device 100, the TX 122, the capacitors 112 and 114, and the RX 134 can be referred to as being included in the first (unidirectional) isolation channel, while the TX 132, the capacitors 116 and 118, and the RX 124 can be referred to as being in the second (unidirectional) isolation channel. In some implementations, such as the device 100, data can be respectively communicated in the first isolation channel and in the second isolation channel in a similar or same way. Accordingly, for purposes of brevity and clarity, communication of data in (and operation of) the first and second isolation channels will be described, by way of example, with respect to the first isolation channel.

In some implementations, the TX 122 can transmit an encoded (e.g., Manchester encoded) digital bit stream (including serialized data received on multiple data channels coupled with the primary data communication circuit 120). In some implementations, the encoded digital bit stream can be differentially transmitted (e.g., from the TX 122 to the RX 134 via the capacitors 112 and 114) by modulating an RF carrier with On/Off keying modulation, where the data of the encoded digital bit stream is used as a modulation key. A rectifier (e.g., a full-wave rectifier) in the RX 134 can detect an envelope of the modulated RF carrier signal received from the TX 122 by rectifying the modulated RF carrier signal. A comparator (e.g., a Schmitt trigger) in the RX 134 can convert (transform, etc.) the detected envelope of the modulated RF carrier to a single-ended digital bit stream, which can be referred to as an unmodulated bit stream, or a baseband digital bit stream. For instance, presence of the RF carrier can be mapped to logic 1, while absence of the RF carrier can be mapped (converted) to logic 0.

In the device 100, a threshold of the comparator in the RX 134 can be calibrated (e.g., during start-up of the device 100) based on amplitude (peak-to-peak amplitude) of a differential signal provided by, e.g., the rectifier, which can correspond to an amplitude (peak-peak amplitude) of the modulated RF carrier signal received from the TX 124. Such approaches can reduce adverse effects on data communication due amplitude variations and/or DC offsets (e.g., such as variations that can occur due to differences in material properties, manufacturing variations, etc.), which can improve performance of the device 100. The data communication devices 120 and 130 can also include (e.g., in the RXs 124 and 134) LC resonant circuits that can provide a frequency-selective, high-pass function that amplifies the RF carrier frequency, and attenuates lower frequency noise, to provide noise immunity and further improve signal quality. A corner frequency of such LC resonant circuits can be established based on a frequency of the RF carrier signal (e.g., with the corner frequency being less that the frequency of the RF carrier).

Figure 2:
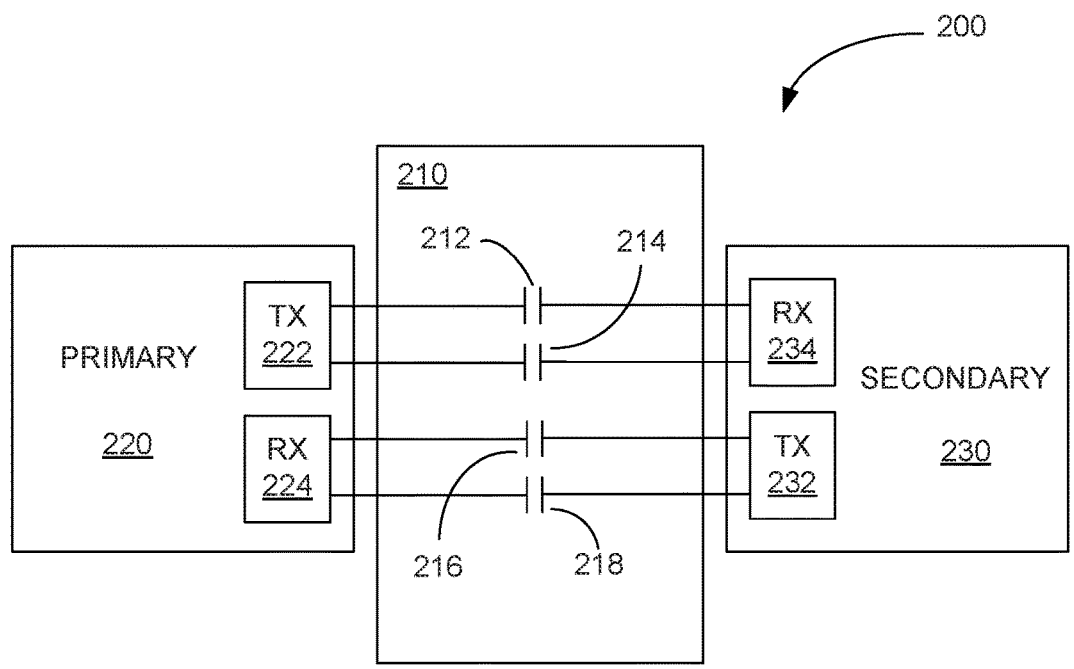

FIG. 2 is a block diagram illustrating another data communication device 200. As shown in FIG. 2, the data communication device 200 includes a substrate 210, a primary (first, etc.) data communication circuit 220 and a secondary (second, etc.) data communication circuit 230. As with the substrate 110, the substrate 210 can be a printed circuit substrate, such as a ceramic substrate, an FR4 substrate, or any appropriate substrate material having dielectric (electrical insulation) properties.

Similar to the data communication device 100, the primary data communication circuit 220 and the secondary communication circuit 230 can be implemented on respective integrated circuits (ICs). In contrast to the data communication circuits 120 and 130 of the device 100, the primary data communication circuit 220 (e.g., a first IC) and the secondary communication circuit 230 (e.g., a second IC), as shown in FIG. 2, are not disposed on (coupled with, etc.) the substrate 110. In some implementations, the data communication circuits (ICs) 220 and 230 of the device 200 can be disposed on a leadframe. Further, the primary data communication circuit 220 and the secondary data communication circuit 230 can be electrically coupled with capacitor pairs included in the substrate 220 using circuit traces and/or conductive vias included on the substrate 210, as well as electrical connections between the leadframe and the substrate 210, and flip-chip solder connections and/or wire bonds between the respective ICs and the leadframe.

As shown in FIG. 2, capacitor pairs for two unidirectional isolation channels of the device 200 can be defined (formed, implemented, etc.) on the substrate 210. In the device 200, a first capacitor pair can include capacitors 212 and 214, and a second capacitor pair can include capacitors 216 and 218. The capacitors 212-218 can be formed using respective capacitor electrodes disposed on opposite sides of the substrate 210. In the device 200, a first unidirectional isolation channel can include a first capacitor pair including the capacitors 212 and 214, while a second unidirectional isolation channel can include a second capacitor pair including the capacitors 216 and 218. The first and second unidirectional isolation channels of the device 200 can be used for bi-directional data communication (e.g., between two different power domains).

As shown in FIG. 2, the primary data communication circuit 220 includes a TX 222 and a RX 224. While the secondary data communication circuit includes a TX 232 and a RX 234. In the device 200, the capacitors 212 and 214 can provide differential series coupling between the TX 222 of the primary data communication circuit 220 and the RX 234 of the secondary data communication circuit 230. Also in the device 200, the capacitors 216 and 218 can provide differential series coupling between the TX 232 of the secondary data communication circuit 230 and the RX 224 of the primary data communication circuit 220. In the device 200, the TX 222, the capacitors 212 and 214, and the RX 234 can be referred to as being included in the first (unidirectional) isolation channel, while the TX 232, the capacitors 216 and 218, and the RX 224 can be referred to as being in the second (unidirectional) isolation channel. Similarly as described above with respect to the device 100, in the device 200, data can be respectively communicated (unidirectionally communicated) in the first isolation channel (from the TX 222 to the RX 234) and in the second isolation channel (from the TX 232 to the RX 224) to implement bi-directional data communication.

Figure 3:
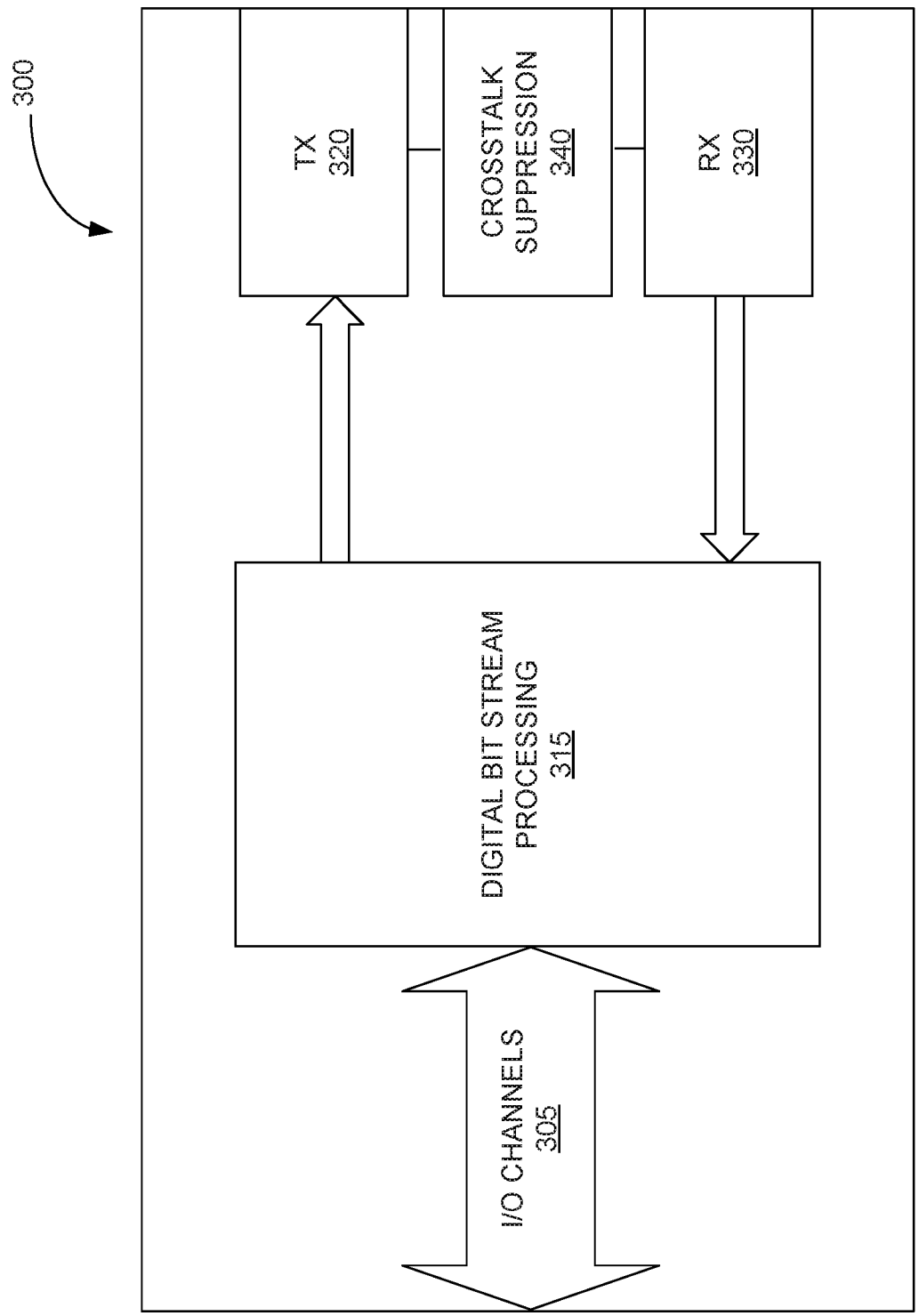
FIGS. 3 and 4 are block diagrams illustrating data communication circuits that can be included in a data communication device, such as the data communication devices of FIGS. 1 and 2.

FIG. 3 is a block diagram illustrating a data communication circuit 300 that can be included in a data communication device, such as the data communication devices 100 and 200 of FIGS. 1 and 2. For example, in some implementations, the circuit 300 can be used to implement the data communication circuits 120, 130, 220 and 230. As shown in FIG. 3, the circuit 300 includes input/output (I/O) channels 305, a digital bit stream processing block 315, a TX 320, a RX 330 and a crosstalk suppression circuit 340.

The I/O channels 305 can include a plurality of bi-directional I/O channels implemented in, e.g., an I/O switch circuit. The digital stream processing block 315 can receive incoming data (e.g., in parallel) from the I/O channels 305, process the incoming data and provide the processed data (e.g., as a serialized, Manchester encoded digital bit stream) to the TX 320. The TX 320 can then transmit the processed data received from the digital stream processing block 315 (e.g., using On/Off keying of a RF carrier signal) over a first unidirectional differential isolation channel.

The RX 330 of the circuit 300 can receive an incoming digital bit stream over a second unidirectional differential isolation channel, such as in the form of a modulated RF carrier signal. In some implementations, such as those described herein, the RX 330, using a rectifier and comparator, can map (convert, etc.) the received modulated RF carrier signal to a single-ended baseband digital bit stream (which can be a Manchester encoded bit stream) using envelope detection. The RX 330 can provide the baseband digital bit stream to the digital bit stream processing block 315, which can decode and deserialize the baseband digital bit stream and provided the deserialized data to the I/O channels 305, which can then output the deserialized data on the appropriate, corresponding I/O channels of the I/O channels 305.

In data communication devices such as the devices 100 and 200 of FIGS. 1 and 2, because the capacitor pairs of the differential isolation channels are implemented on a common substrate, crosstalk can occur between the isolation channels due to parasitic capacitive coupling in the common substrate (e.g., the substrate 110 or the substrate 210). The crosstalk suppression circuit 340 can be configured to suppress (cancel, etc.) this crosstalk using negative feedback. Example approaches for providing such negative feedback are discussed further below, such as with respect to FIGS. 5, 7 and 8.

Figure 4:
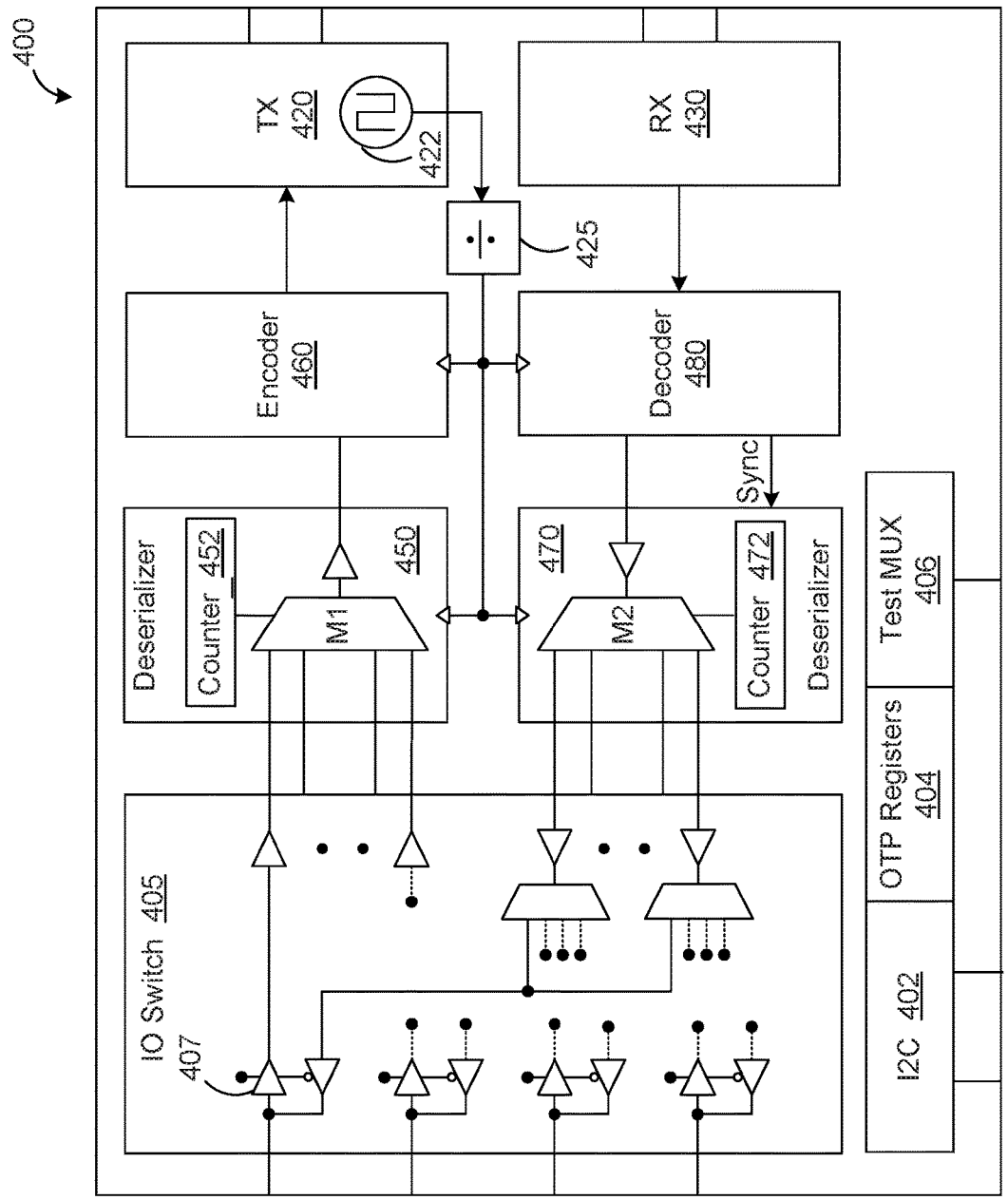

FIG. 4 is a schematic block diagram illustrating a data communication circuit 400 that can be included in a data communication device, such as the data communication devices 100 and 200 of FIGS. 1 and 2. For example, in some implementations, the circuit 300 can be used to implement the data communication circuits 120, 130, 220 and 230. The circuit 400 can include additional aspects, such as the crosstalk suppression circuit 340, or other aspects of the circuit 300. Furthermore, aspects of the circuit 400 can be implemented in the circuit 300, such as is appropriate for a particular implementation.

As shown in FIG. 4, the circuit 400 can include an inter-integrated circuit ($I^2C$) bus interface 402, one-time-programmable (OTP) registers 404, a test mux 406, an I/O switch 405, a TX 420, a RX 430 a serializer 450, an encoder 460, and a decoder 480. In some implementations, the $I^2C$ bus interface 402 can be used for programming the OTP registers 404, configure the test mux 406, and/or access other features of the circuit 400 (e.g., debugging features, etc.). The OTP registers 404 can be used to store various information regarding operation and or configuration of the circuit 400, such as a number of I/O channels being serialized and deserialized, direction of data communication, logic polarity, default state, and/or activating other features such as enable and clock I/O functions, as some examples. The OTP registers can also be used to store settings for operation of the circuit 400, such as threshold and bias, etc. The test mux 406 can be used as an interface for functional testing of the circuit 400.

In the circuit 400, the I/O switch 405 (which could be used to implement the I/O channels 305 of the circuit 300) includes a plurality of bi-directional I/O drivers 407, as well as circuitry for controlling transfer of data from I/O drivers 407 of the I/O switch 405 and the serializer 450, and for controlling transfer of data from the deserializer 470 to the I/O drivers 407 of the I/O switch 405. While the I/O switch 405 is illustrated as including four bi-directional data channels, in some implementations, the I/O switch 405 can implement different numbers of I/O channels. In some implementations, the number of bi-directional I/O channels implemented by the I/O switch 405 can be programmable, e.g., based on a value stored in the OTP registers 404.

The TX 420 of the circuit 400 can include an oscillator circuit 422 that provides a clock signal that can be used in operation of the circuit 400. The circuit 400, as shown in FIG. 4, further includes a clock divider 425 that can be configured to provide a divided clock signal to serializer 450, the encoder 460, the deserializer 470 and the decoder 480, for use in digital bit stream processing.

As shown in FIG. 4, the serializer 450 can include a counter 452 and a mux M1 that are used to serialize the data received from the I/O switch 405 into a serial digital bit stream. The counter 452 can be used to track the sequencing of the data from the I/O channels of the I/O switch 405 in the serial bit stream. The counter 452 can be an overflow counter that operates in correspondence with the number of bi-directional I/O channels that are implemented by the I/O switch 405. For instance, in the example illustrated in FIG. 4, the counter can be configured to count up from 0 to 3 (four values) and then overflow (re-initialize, etc.) to zero, in order to continuously sequence data from the I/O channels in the digital bit stream produced by the serializer 450.

The serial digital bit stream produced by the serializer 450 can be provided to the encoder 460, which can produce a corresponding encoded (e.g., Manchester encoded) digital bit stream. The encoded digital bit stream (e.g., a single-ended baseband digital bit stream) can be provided to the TX 420, and the TX 420 can differentially transmit the encoded digital bit stream, e.g., using On/Off keying of an RF carrier signal, via a first unidirectional isolation channel.

In the circuit 400, the RX 430 can receive an encoded (e.g., Manchester encoded) digital bit stream (e.g., as a differential On/Off key modulated RF carrier signal). The RX 430, using the approaches described herein, can map (convert, etc.) the received differential signal (using a rectifier for envelope detection and a comparator) to produce a single-ended encoded digital bit stream that is provided to the decoder 480. The decoder can then recover a clock signal from the encoded digital bit stream provided by the RX 430 and use the recovered clock signal to decode (e.g., using Manchester decoding) to produce an decoded digital bit stream that can be provided to the deserializer 470.

As shown in FIG. 4, the deserializer 470 can include a counter 472 and a multiplexer (demux) M2 that can be used to deserialize the decoded digital bit stream from the decoder 480 into individual data bits. The counter 472 can be used to track the sequencing of the deserialized data bit data for transmission to corresponding I/O channels of the I/O switch 405. As with the counter 452, the counter 472 can be an overflow counter that operates in correspondence with the number of bi-directional I/O channels that are implemented by the I/O switch 405. For instance, in the example illustrated in FIG. 4, the counter 472 can be configured to count up from 0 to 3 (four values) and then overflow (re-initialize, etc.) to zero, in order to continuously track ordering of the decoded bits.

Figure 5:
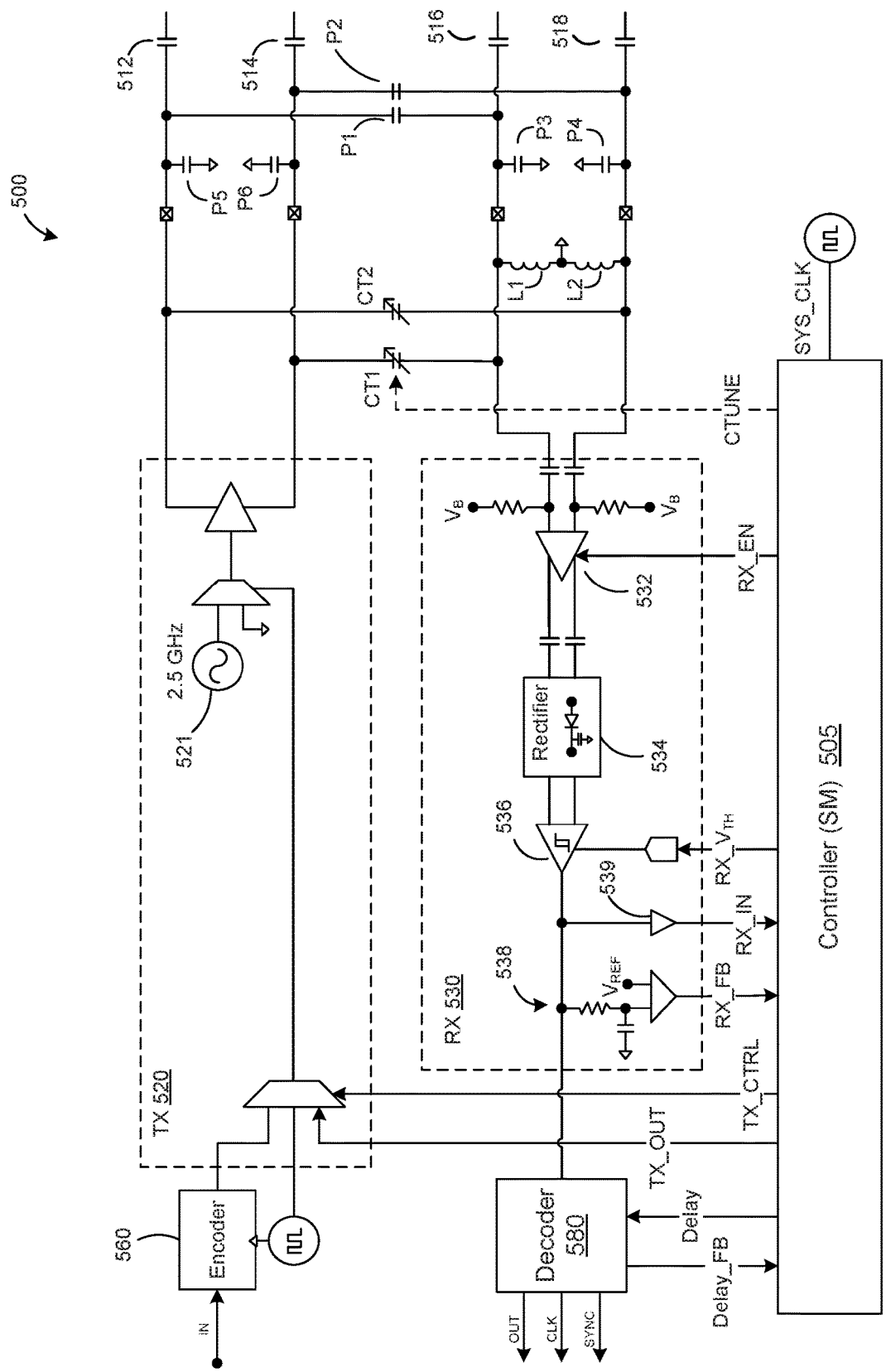
FIG. 5 is a schematic block diagram illustrating a circuit that can be used to implement, at least in part, the data communication circuits of FIGS. 3 and 4.

FIG. 5 is a schematic block diagram illustrating a circuit 500 that can be used to implement, at least in part, the data communication circuits 300 and 400 of FIGS. 3 and 4. Further, the circuit 500, in some implementations, can be used to implement, at least in part, the data communication circuits 120, 130, 220 and 230 of the devices 100 and 200 shown in FIGS. 1 and 2.

As shown in FIG. 5, the circuit 500 includes a controller (state machine) 505, a TX 520, a RX 530, an encoder 560 and a decoder 580. Also shown in FIG. 5 are capacitors 512 and 514, which can be a transistor pair of a first unidirectional differential isolation channel, and capacitors 516 and 518, which can be a transistor pair of a second unidirectional differential isolation channel, such as the isolation channels that are described herein.

The circuit 500 in FIG. 5 also includes parasitic capacitances P1, P2, P3, P4, P5 and P6, which can be parasitic capacitances of a substrate used to implement the isolation channels, such as the substrates 110 and 210 in FIGS. 1 and 2. In some implementations, where the capacitors 512-518 are included on a common substrate (such as with the substrates 110 and 210), mutual coupling parasitic capacitance (represented by the capacitors P1 and P2) can be present between the associated isolation channels. Such mutual coupling parasitic capacitance can be present as a result of a distance between insulated plates (e.g., of a single capacitor on opposite sides of the substrate) being comparable to a distance between capacitor plates of adjacent isolation channels. Such parasitic mutual coupling between two isolation channels can introduce crosstalk interference. For instance, in the circuit 500, parasitic mutual coupling, as shown by the capacitor P1, can be present between a plus (+) differential output of the TX 520 and a plus (+) differential input of the RX 530. Also, in the circuit 500, parasitic mutual coupling, as shown by the capacitor P2, can be present between a minus (−) differential output of the TX 520 and a minus (−) differential input of the RX 530.

In the circuit 500, adjustable capacitors CT1 and CT2, which can be included in the crosstalk suppression circuit 340 of FIG. 3, can be used to suppress crosstalk due to the parasitic mutual coupling of capacitors P1 and P2. As shown in FIG. 5, the adjustable capacitor CT1 is coupled between the + output of the TX 520 and the − input of the RX 530, while the adjustable capacitor CT2 is coupled between the − output of the TX 520 and the + input of the RX 530. In such an arrangement, the adjustable capacitors CT1 and CT2 can apply signals (voltages, etc.) that are of an opposite polarity of crosstalk present on the capacitors P1 and P2, which creates negative feedback to suppress that crosstalk. That is, interfering (crosstalk) signals leaked through the parasitic capacitors P1 and P2 (e.g., from the TX 520 to the RX 530) can be suppressed at the + and − inputs of the RX 530 by the negative feedback from the adjustable capacitors CT1 and CT2. Respective capacitances of the adjustable capacitors CT1 and CT2 for suppressing crosstalk can be determined (adjusted) during a startup sequence of a data communication device that includes the circuit 500. An example approach for such adjustment is described in further detail below with respect to FIGS. 7 and 8.

The parasitic capacitors P3, P4, P5 and P6, as shown in FIG. 5, can be parasitic capacitances to electrical ground (through a corresponding substrate). As shown in FIG. 5, the circuit 500 can include inductors L1 and L2. The inductors L1 and L2, in combination with the parasitic capacitances P3 and P4, form an LC resonant circuit that can provide the frequency-selective, high-pass function described above with respect to FIG. 1. This LC resonant circuit can, accordingly, provide low-frequency noise immunity (e.g., below a corner frequency of the LC resonant circuit) for the RX 530.

As shown in FIG. 5, the TX 520 includes an On/Off key modulated transmitter that can differentially transmit an encoded digital bit stream that is provided by the encoder 560 by modulating an RF carrier signal 521. In the circuit 500, the controller 505 can be coupled with transmitter 520 to control operation of the transmitter 520 (e.g., using signals TX_OUT and TX_CTRL).

In the circuit 500, as illustrated in FIG. 5, the RX 530 can include a broadband voltage buffer 532, a rectifier 534, a comparator 536, an averaging circuit 538 and a signal buffer 539. The RX 530 can also include biasing elements (e.g., resistors and capacitors) for the RX 530. The controller 505 can be coupled with the RX 530 to provide an RX_EN signal to enable (or disable) the broadband voltage buffer 532 during operation of the circuit 500. The controller 505 can be further coupled with the RX 530 to receive an output of the averaging circuit 538 (as RX_FB), set a threshold (as $RX\_V_{TH}$) of the comparator 536 (which can be implemented as a Schmitt trigger), and to monitor, via the signal buffer 539, an output (as RX_IN) of the comparator 536 (e.g., to monitor for occurrence of fault conditions, such as loss of an input digital stream in the RX 530). The averaging circuit 538 can be used, during a startup sequence of a data communication circuit including the circuit 500, to determine a threshold for the comparator 536. In some implementations, the threshold of the comparator 536 can be an average amplitude of a 50% duty cycle square wave calibration signal, where the calibration signal can correspond with a clock signal of a data communication device that is transmitting to the RX 530.

The rectifier 534 (e.g., a full-wave rectifier) can detect an envelope of a modulated RF carrier signal (e.g., corresponding with an encoded digital bit stream) received by the RX 530. The comparator 536 can map (convert, etc.) the detected envelope of the modulated RF carrier to a single-ended digital bit stream, which can be referred to as an unmodulated bit stream, a decoded bit stream, a baseband digital bit stream, etc. For instance, presence of the RF carrier can be mapped to logic 1 in the decoded bit stream, while absence of the RF carrier can be mapped (converted) to logic 0 in the decoded bit stream.

The decoded bit stream produced by the RX 530 can be provided to the decoder 580, which can recover a clock signal from the decoded bit stream. The recovered clock signal, which can correspond with a clock signal of a data communication device from which the decoded bit stream was initially transmitted, can be recovered using a delay that is determined from the calibration signal used to determine the threshold for the comparator 536 (e.g., during the startup sequence of the circuit 100). The controller 505 can be coupled the decoder 580, so as to communicate with the decoder to determine the delay and implemented the determined delay (using signals DELAY_FB and DELAY). An example approach for determining the delay used for clock recovery is discussed in further detail below with respect to FIGS. 7 and 8.

Figure 6:
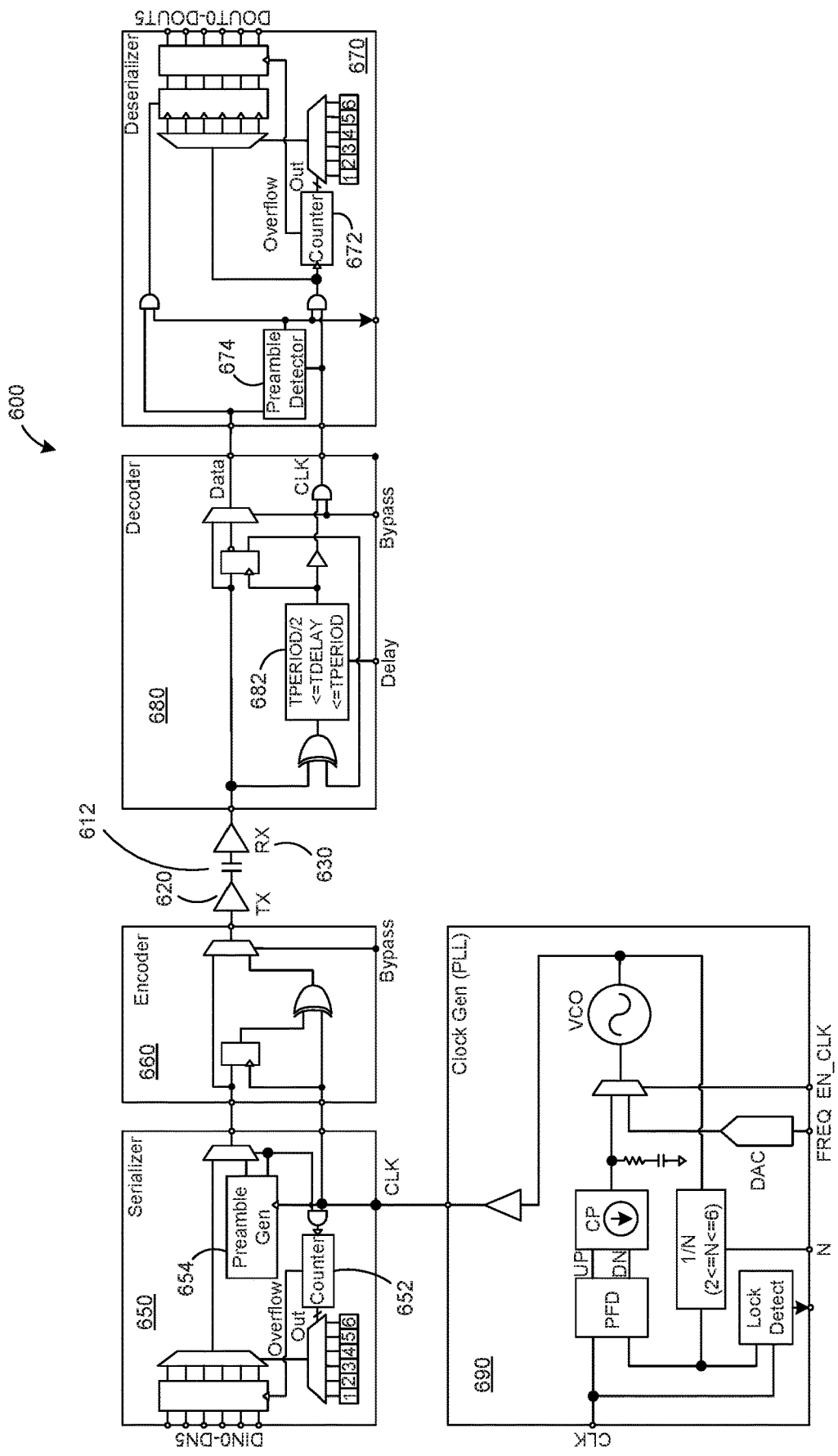
FIG. 6 is a schematic block diagram illustrating a unidirectional data communication path of a data communication device.

FIG. 6 is a schematic block diagram illustrating a unidirectional data communication path (path) 600 of a data communication device, such as the data communication devices 100 and 200 of FIGS. 1 and 2. As shown in FIG. 6, the path 600 can include, from left to right, a serializer 650, an encoder 660, a TX 620, isolation channel capacitor(s) 612, a RX 630, a decoder 680, and a deserializer 670. In some implementations, the path 600 can be used to implement each of the unidirectional data communication paths (isolation channels) of a data communication device, such the two unidirectional paths of devices 100 and 200. In the path 600, separation of differential signals is not illustrated, though differential signaling can be implemented in the path 600, such as using the approaches described above with respect to FIGS. 1-5.

Also shown in FIG. 6 is a PLL 690, which can be used as an external clock signal generator (e.g., external to a data communication circuit, such as the circuits 300, 400 and 500). In some implementations, a clock signal produced by the PLL 690 can be used in place of an internally generated clock signal (e.g., a clock signal generated by a CMOS oscillator included in a data communication circuit).

In the path 600 shown in FIG. 6, the serializer 650 can receive data from I/O channels of an I/O switch, such as the I/O switch 405 shown in FIG. 4. As with the serializer 450 of FIG. 5, the serializer 650 can include a counter 652 that is used to track sequencing of the received data in a serialized bit stream produced by the serializer 650. The serializer 650 can also include a preamble generator 654 that can be used during a startup sequence of a corresponding data communication device in which the path 600 is implemented. In some implementations, the preamble generator 654 can be used to generate packets that can be used to control progress of such a startup sequence. These packets can include handshake request packets, handshake response packets and sync packets indicating successful completion of the startup sequence, and can be sent without encoding by the encoder 660 because completion of a successful handshake sequence may be needed to calibrate a delay for clock recovery, e.g., before enabling the encoding function.

The serialized bit stream produced by the serializer 650 can be provided to the encoder 660, which is a Manchester encoder in the path 600. The encoder 660 can encode the serialized bit stream to generate an encoded bit stream. The encoded bit stream can be provided to the TX 620 and transmitted over the isolation channel (e.g., via the isolation capacitor(s) 612) to the RX 630 using the approaches described herein (e.g., On/Off key modulation). As described herein, the RX 630 can perform envelope detection on an On/Off key modulated RF signal received from the TX 620 to produce an encoded bit stream (corresponding with the encoded bit stream produced by the encoder 660).

Figure 11:
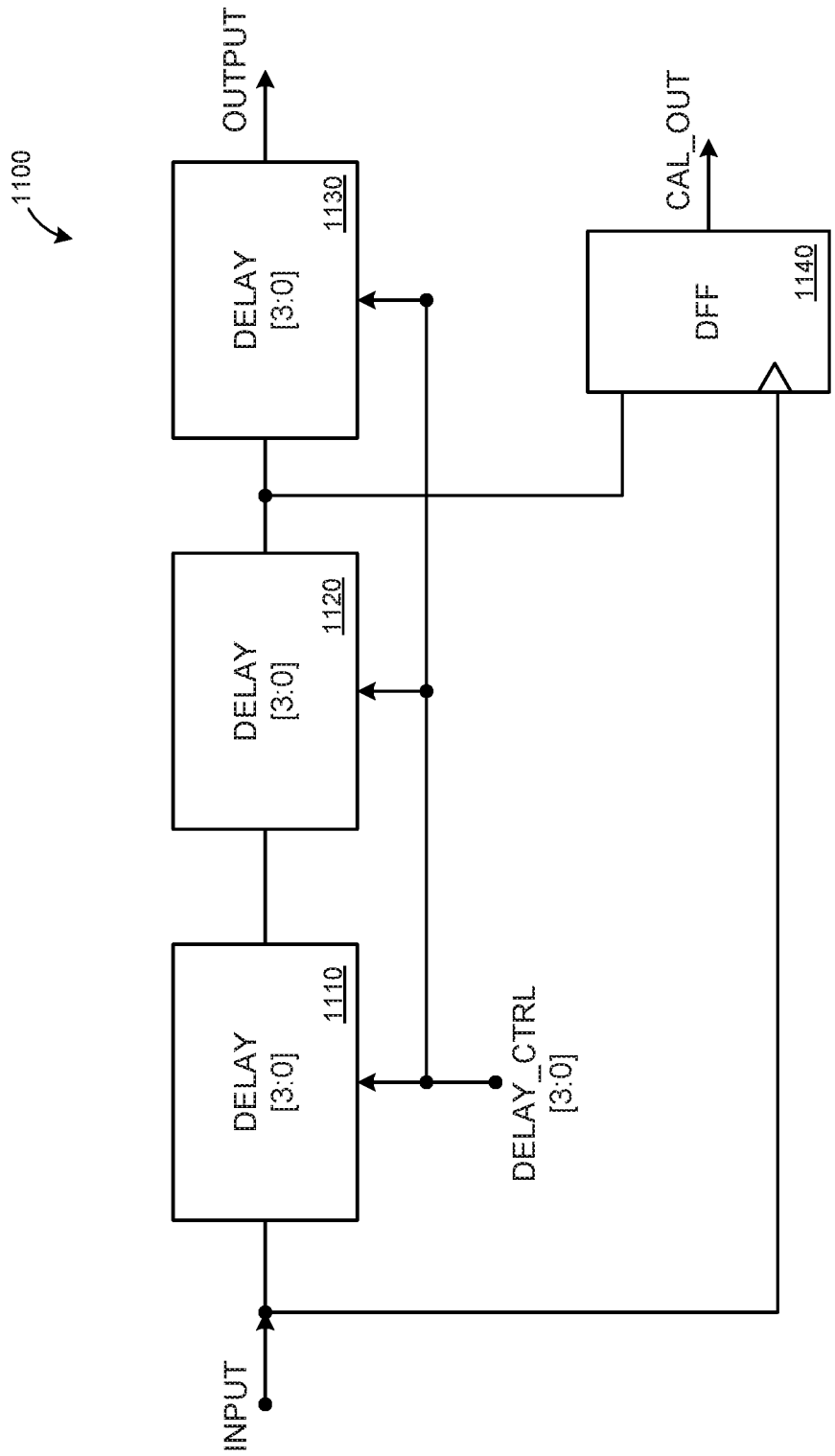
FIG. 11 is a block diagram of a circuit for clock recovery.

The encoded bit stream produced by the RX 630 can be provided to the decoder 680. The decoder 680 can recover a clock signal from the encoded bit stream received from the RX 630 using a delay block that applies a $T_{DELAY}$ for clock recovery, where $T_{DELAY}$ is proportional to a period of the clock used by the encoder 660 to generate the encoded digital bit stream. $T_{DELAY}$ can be determined during the startup sequence, such as using approaches described herein. An example approach for determining a clock recovery delay, such as can be implemented in a clock recover delay block 682, is illustrated in FIG. 11, and discussed below.

The decoder 680, which, in this example implementation, includes a Manchester decoder, can recover a clock signal (e.g., recovered using the delay block 682) from the Manchester encoded bit stream received from the RX 630. The recovered clock signal can then be used by the decoder 680 to decode the encoded bit stream provided by the RX 630, and to produce a decoded bit stream corresponding the with bit stream produced by the serializer 650. Use of Manchester encoding results in an encoded bit stream signal that toggles (e.g., once per period) regardless of whether the associated data is changing logic values. For instance, if the data value of a Manchester encoded signal is not changing, the frequency (period) of encoded signal will be equal to a frequency (period) of the clock signal used to generate the signal, while the frequency (period) will be equal to a frequency (period) that corresponds with one-half the clock frequency when the data of the encoded bit stream is changing. Accordingly, in some implementations, a delay that is approximately three-quarters of the clock period (e.g., the period of the clock of transmitting device) can be used for clock recovery, where the delay is applied by the decoder to lock to one-half the clock frequency.

The decoded bit stream can be provided to the deserializer 670, which can use the recovered clock to deserialize the decoded bit stream. As with the deserializer 470 of FIG. 4, the deserializer 670 can include a counter 672 that can be used to track the sequencing of the deserialized data bit data for transmission to corresponding I/O channels of an I/O switch. The deserializer 670 can also include a preamble detector 674 that can be used to detect packets generated by the preamble generator 654 during a startup sequence.

Figure 7:
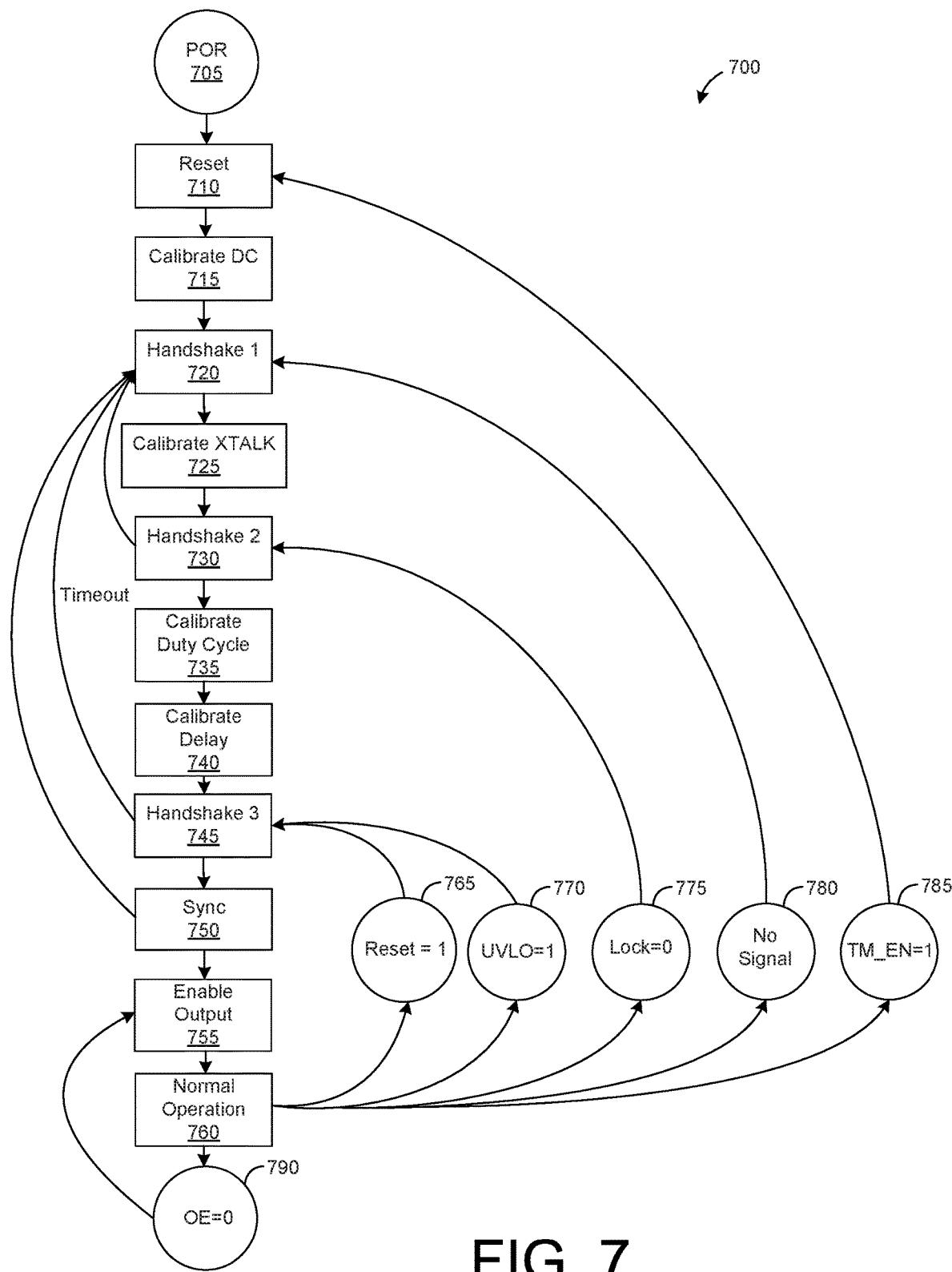
FIG. 7 is a state diagram that can be implemented in a data communication device.

FIG. 7 is a state diagram 700 that can be implemented in a data communication device, such as the data communication devices 100 and 200 of FIGS. 1 and 2. The state diagram 700 can be implemented by the data communication circuits 300, 400 and 500 shown in FIGS. 3-5, and by the path 600 shown in FIG. 6 (e.g., by the controller 505 of FIG. 5). The state diagram 700 illustrates a startup sequence of a data communication device and, after completion of the startup sequence, entry into a normal operation mode of the data communication device.

Figure 8A:
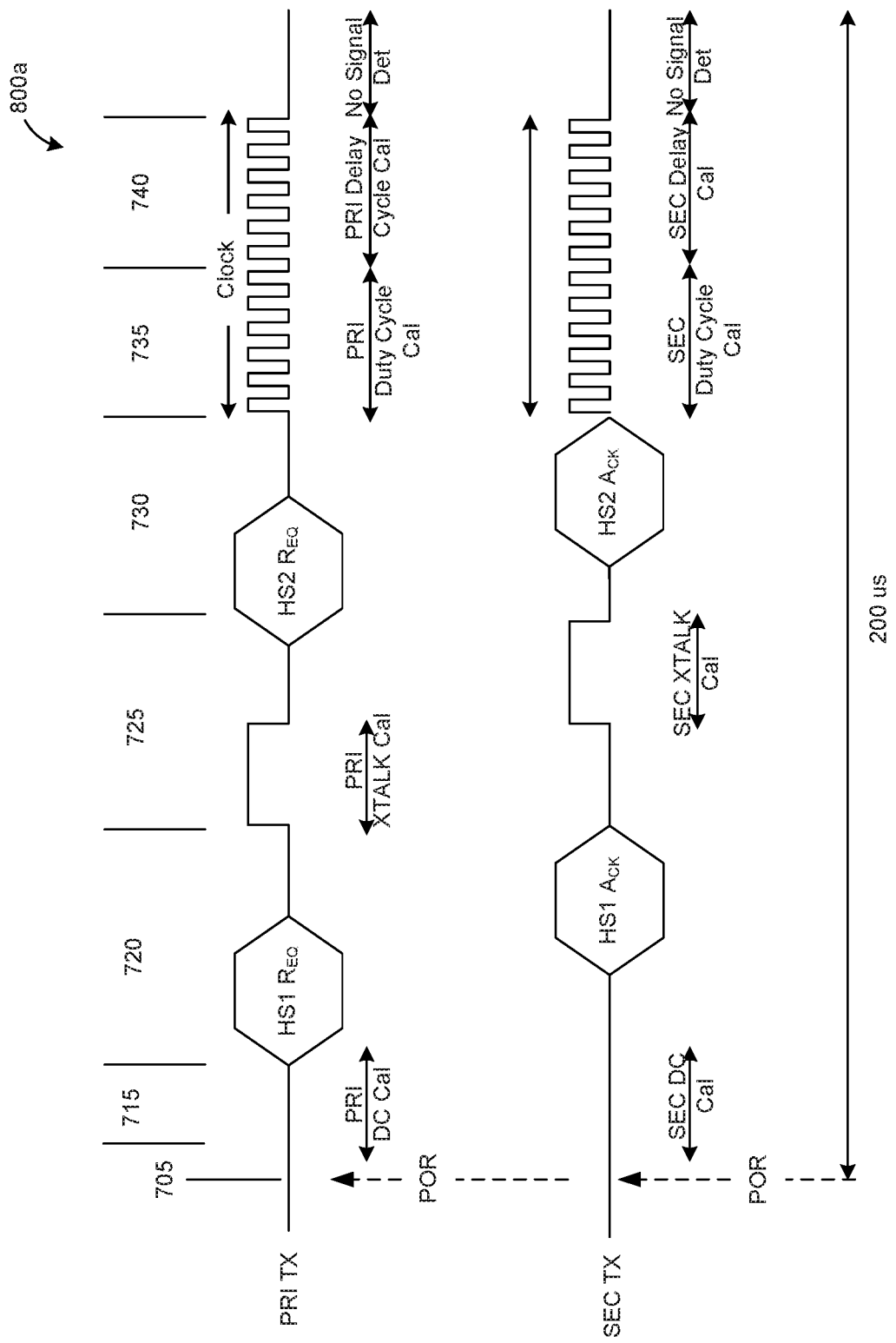
FIGS. 8A and 8B illustrate a timing diagram that corresponds with the state diagram of FIG. 7.
Figure 8B:
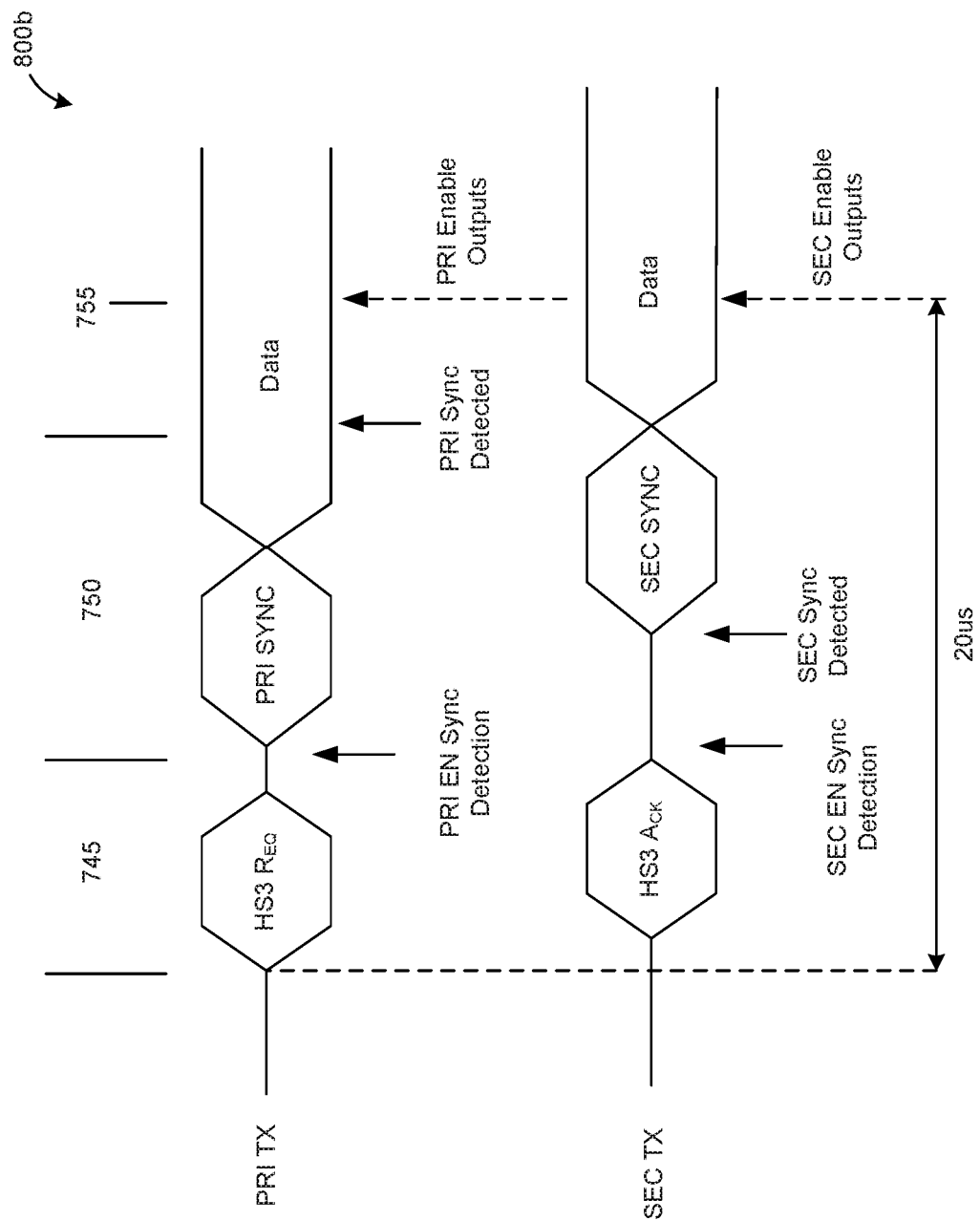

FIGS. 8A and 8B, illustrate a timing diagram that schematically illustrates timing of, and implementation of the state diagram 700, without illustrating fault conditions shown in FIG. 7. A first portion of the timing diagram 800a is shown in FIG. 8A. A second portion of the timing diagram 800b, which can follow the first portion of the timing diagram 800*a* is shown in FIG. 8B. The first timing diagram portion 800*a* and the second timing diagram portion 800*b* can be collectively referred to as timing diagram 800, such as in the follow discussion. Indications of states of the state diagram 700 are also provided in FIGS. 8A and 8B for purposes of illustration. Accordingly, the state diagram 700 of FIG. 7 and the timing diagram 800 of FIGS. 8A and 8B are described together in the following discussion, with further reference being made to FIGS. 1-5 as appropriate for purposes of illustration. Also, in the following discussion of FIGS. 7, 8A and 8B, reference is made to a primary circuit (PRI) and a secondary circuit (SEC), which can be, respectively, the primary data communication circuit and the secondary data communication circuit of a data communication device, such as the data communication devices 100 and 200.

At state 705, the data communication device can be powered up causing a power-on-reset (POR) to occur in the primary circuit and the secondary circuit. At state 710 (not shown in FIG. 8A or 8B) the primary circuit and the secondary circuit can be set to an initial state (e.g., not calibrated, etc.) in response to occurrence of the POR at state 705. At state 715, the primary circuit and the secondary circuit can perform a direct current (DC) calibration, which can include, e.g., in the circuit 500, disabling the buffer 532 to block external input signals and then adjusting a threshold of the detector 536 to cancel a residual DC offset input signal (e.g., to compensate for capacitor mismatch, or other circuit and/or signal variations.).

At state 720, a first handshake request and response (handshake 1) can be performed by the primary circuit and the secondary circuit. As shown in FIG. 8A, handshake 1 at state 720 can include the primary (PRI) circuit sending a first handshake request (HS1 Req). The HS1 Req can be a specific packet (e.g., generated by the preamble generator 654 of the primary circuit) that the secondary circuit is configured to recognize (e.g., using its preamble detector 674) as the first handshake request. In response to receiving the HS1 Req from the primary circuit, the secondary circuit can send a first handshake response or acknowledgement (HS1 Ack) to the primary circuit. The HS1 Ack can be a specific packet (e.g., generated by the preamble generator 654 of the secondary circuit) that the primary circuit is configured to recognize (e.g., using its preamble detector 674) as the first handshake acknowledgment. If the primary circuit does not receive the HS1 Ack within a certain period of time, the primary circuit can resend the HS1 Req, which can be repeated until the primary circuit receives the HS1 Ack from the secondary circuit.

After completing the handshake 1, crosstalk suppression calibration can be performed at state 725. As shown in FIG. 8A, the primary circuit can perform its crosstalk suppression calibration and, after the primary circuit has completed its crosstalk suppression calibration, the secondary circuit can perform it crosstalk suppression calibration. Each of the primary circuit and the secondary circuit can perform crosstalk suppression as follows. The circuit performing crosstalk suppression calibration can transmit a signal with its transmitter while the other circuit remains idle (does not transmit but monitors the corresponding isolation channel (e.g., with its receiver) for completion of crosstalk suppression calibration by the other circuit.

Referring to FIG. 5, while the circuit performing crosstalk suppression calibration is transmitting, e.g., with the TX 520, the controller 505 can, using the signal CTUNE, adjust (e.g., sequentially increase) capacitances of the adjustable capacitors CT1 and CT2 until a capacitance value for each adjustable capacitor is selected that produces a highest reduction in crosstalk from the parasitic capacitors P1 and P2 at the RX 530. In some implementations, this determination can be made by the controller monitoring the RX_IN signal from the RX 530, or monitoring another signal that is indicative of the crosstalk suppression. After completing crosstalk suppression calibration, the circuit being calibrated stops transmitting, which can be detected by the other circuit. For instance, if the primary circuit has completed its crosstalk suppression calibration and stopped transmitting, the secondary circuit (e.g., with its receiver) can detect that the primary circuit is no longer transmitting (has completed crosstalk suppression calibration) and, in response, can begin its crosstalk suppression calibration using the approach described above.

Once the secondary circuit completes its crosstalk suppression calibration and stops transmitting, the primary circuit (e.g., with its receiver) can detect that the secondary circuit is no longer transmitting (has completed crosstalk suppression calibration) and, in response, can begin, at state 730, a second handshake request and response (handshake 2) sequence. As shown in FIG. 8A, handshake 2 at state 730 can include the primary circuit sending a second handshake request (HS2 Req). The HS2 Req can be a specific packet (e.g., generated by the preamble generator 654 of the primary circuit) that the secondary circuit is configured to recognize (e.g., using its preamble detector 674) as the second handshake request.

In response to receiving the HS2 Req from the primary circuit, the secondary circuit can send a second handshake response or acknowledgement (HS2 Ack). The HS2 Ack can be a specific packet (e.g., generated by the preamble generator 654 of the secondary circuit) that the primary circuit is configured to recognize (e.g., using its preamble detector 674) as the second handshake acknowledgment. If the primary circuit does receive the HS2 Ack within a certain period of time, the primary circuit can resend the HS2 Req (without returning to handshake 1), which can be repeated until the primary circuit receives the HS2 Ack. Alternatively, if the primary circuit does receive the HS2 Ack within a certain period of time (TIMEOUT as indicated in FIG. 7), the primary circuit can send a HS1 Req, and operation can return to state 710.

After completing the handshake 2, at state 735, each of the primary circuit and the secondary circuit can transmit a respective clock signal (e.g., as a 50% duty cycle square wave) that will be used for digital bit stream processing prior to transmission (e.g., serializing and encoding). As shown in FIG. 8A, the primary circuit and the secondary circuit, at state 735 can perform a duty cycle calibration, which (referring to FIG. 5) can include the averaging circuit determining an average amplitude (e.g., an average of a peak-to-peak amplitude) of the received clock signal. This average value can be communicated to the controller 505 (using RX_FB) and used as a threshold for the comparator 536. At state 735, the primary circuit and the secondary circuit can perform a delay calibration to determine respective delay values to use for clock recovery in their decoders (such as the decoder 680 shown in FIG. 6. The delay calibration at state 740 can be performed by each of the primary circuit and the secondary using the received clock signal (e.g., calibration signal) from the other circuit. For instance, the delay calibration at state 740 can include adjusting a variable delay to match three-quarters (¾) of a period of a received clock signal.

Once the delay calibration at state 740 is completed, the primary circuit and the secondary circuit (e.g., with their respective receivers) can each detect that the other circuit is no longer transmitting and, in response, the primary circuit can begin, at state 745, a third handshake request and response (handshake 3) sequence. As shown in FIG. 8B, handshake 3 at state 745 can include the primary circuit sending a third handshake request (HS3 Req). The HS3 Req can be a specific packet (e.g., generated by the preamble generator 654 of the primary circuit) that the secondary circuit is configured to recognize (e.g., using its preamble detector 674) as the third handshake request. However, if the primary circuit did not properly complete the duty cycle calibration at state 740 and/or the delay calibration at 745, the process of the state diagram can return to state 730 (e.g., in FIG. 8A) and the primary circuit can, again, initiate another handshake 2 sequence.

In response to receiving the HS3 Req from the primary circuit, which indicates successful completion of the duty cycle and delay calibrations by the primary circuit, the secondary circuit can send a third handshake response or acknowledgement (HS3 Ack), which indicates successful completion of the duty cycle and delay calibrations by the secondary circuit. Or, if the secondary circuit did not properly complete the duty cycle calibration at state 740 and/or the delay calibration at 745, the secondary circuit can send another HS1 Ack, indicating to the primary circuit that another handshake 2 sequence should be initiated, follow by duty cycle calibration and delay calibration. As with the HS1 Ack and the HS2 Ack, the HS3 Ack can be a specific packet (e.g., generated by the preamble generator 654 of the secondary circuit) that the primary circuit is configured to recognize (e.g., using its preamble detector 674) as the third handshake acknowledgment. If the primary circuit does not receive the HS3 Ack within a certain period of time, the primary circuit can resend the HS3 Req (without returning to handshake 1 or handshake 2), which can be repeated until the primary circuit receives the HS3 Ack from the secondary circuit, or the secondary circuit provides an indication that the startup sequence should return to an earlier handshake sequence. Alternatively, if the primary circuit does receive the HS3 Ack within a certain period of time (TIMEOUT as indicated in FIG. 7), the primary circuit can send a HS1 Req, and operation can return to state 710.

After completing the handshake 3 at state 745, the primary circuit and the secondary circuit, at state 750, can exchange SYNC packets to indicate that both the primary circuit and the secondary circuit have completed calibration (completed the startup sequence) and are ready to begin normal operation (e.g., communicating data using the approaches described herein). As shown in FIG. 8B, the SYNC packet exchange at state 750 can include the primary circuit sending a primary SYNC packet, which indicates that the primary circuit is ready to begin normal operation. The primary SYNC packet can be a specific packet (e.g., generated by the preamble generator 654 of the primary circuit) that the secondary circuit is configured to recognize (e.g., using its preamble detector 674) as the primary SYNC packet.

In response to receiving the primary SYNC packet from the primary circuit, the secondary circuit can send a secondary SYNC packet, which indicates the secondary circuit is ready to being normal operation. The second SYNC packet can be a specific packet (e.g., generated by the preamble generator 654 of the secondary circuit) that the primary circuit is configured to recognize (e.g., using its preamble detector 674) as the secondary SYNC packet. If the primary circuit does not receive the secondary SYNC packet within a certain period of time, the primary circuit can resend the primary SYNC packet (without returning to handshake 1, handshake 2 or handshake 3), which can be repeated until the primary circuit receives the secondary SYNC packet from the secondary circuit, or the secondary circuit provides an indication that the startup sequence should return to an earlier handshake sequence. Alternatively, if the primary circuit does receive the secondary SYNC packet within a certain period of time (TIMEOUT as indicated in FIG. 7), the primary circuit can send a HS1 Req, and operation can return to state 710.

After completion of the SYNC packet exchange, at state 755, the output channels are enabled and deserialized data is routed to the respective output channel. After enabling output at state 755, normal operation of the primary circuit and the secondary circuit can begin at state 760, where data is bi-directionally communicated between the primary circuit and the secondary circuit using the approaches described herein. As shown in FIG. 7, when operating in the normal operation mode at 760, various fault states (which are provided by way of example) can occur and result in the primary circuit and the secondary circuit of a corresponding data communication device returning to operate at an earlier state in the state diagram 700. For instance, if a reset of the primary circuit or the secondary circuit occurs at state 765, or an under-voltage lock condition is detected in the primary circuit or the secondary circuit at state 770, operation of the primary circuit and the secondary circuit can return to the handshake 3 sequence at state 745. If variation in a received clock (which can be referred to as a LOCK fault condition) is detected in the primary circuit or the secondary circuit at state 775, operation of the primary circuit and the secondary circuit can return to the handshake 2 sequence at state 730. If the primary circuit or the secondary circuit detects that is not receiving a signal (e.g., the received signal is not toggling, but is at a constant state), a NO SIGNAL fault can occur at state 780, and operation of the primary circuit and the secondary circuit can return to the handshake 1 sequence at state 720. If activation of a test mode of the primary circuit is detected at state 785, operation of the primary circuit and the secondary circuit can return state 710, and the primary circuit and the secondary circuit can be reset and then re-perform the startup sequence. At state 790, the output channels are disabled and a default value is assigned to each of the output channels, where the default state of each channel can be a programmable setting.

The above discussion describes an example startup sequence, normal operation and example fault condition responses, including examples of situations where the startup sequence (e.g., states 710-755) and normal operation (e.g., state 760) of a primary circuit and a secondary circuit implementing the state diagram 700 can return to an earlier state. In some implementations, other situations may result in such a startup sequence returning to an earlier state, or a different state than those indicated above.

Figure 9:
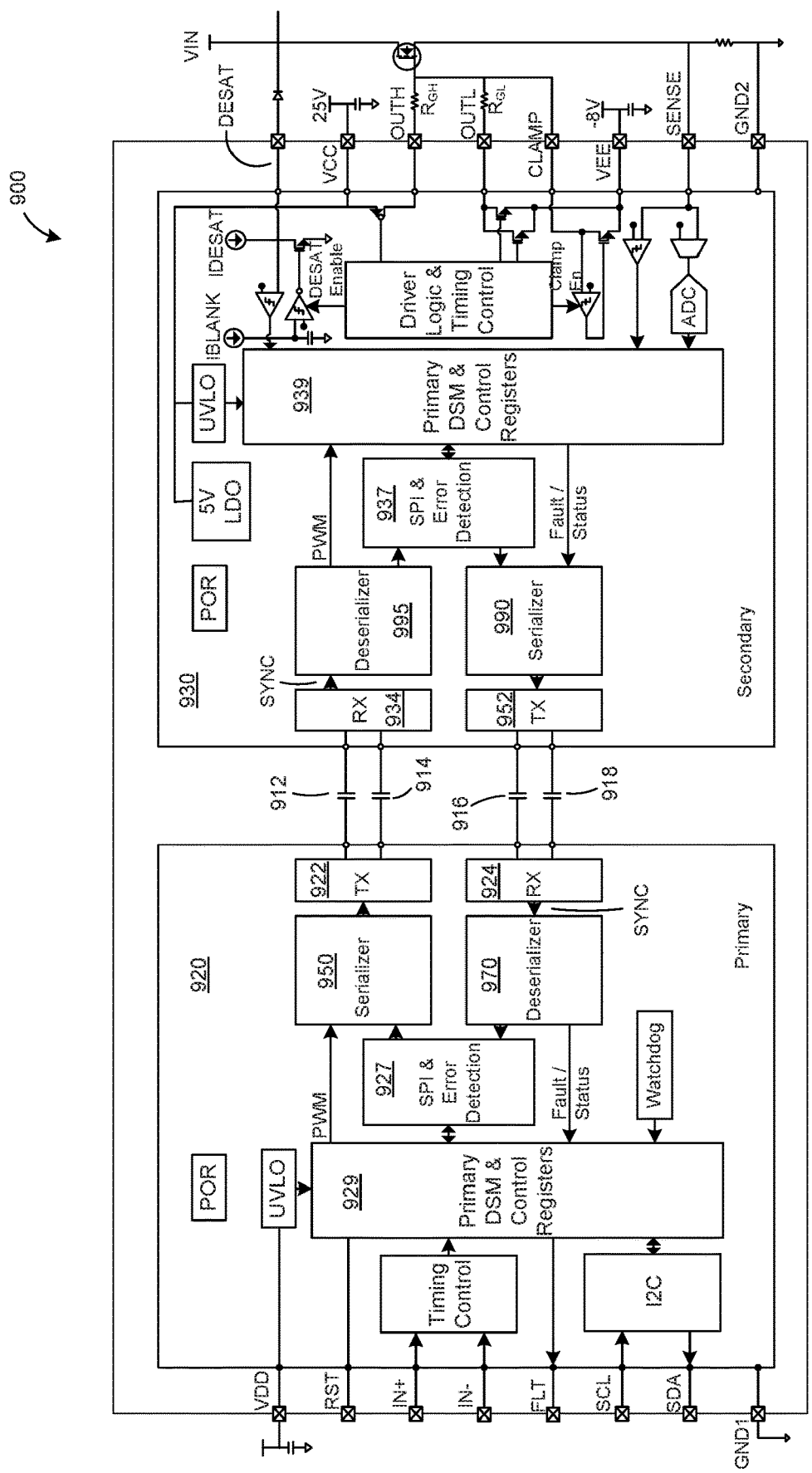
FIG. 9 is a schematic block diagram of a gate driver control circuit that can include a data communication device.
Figure 10:
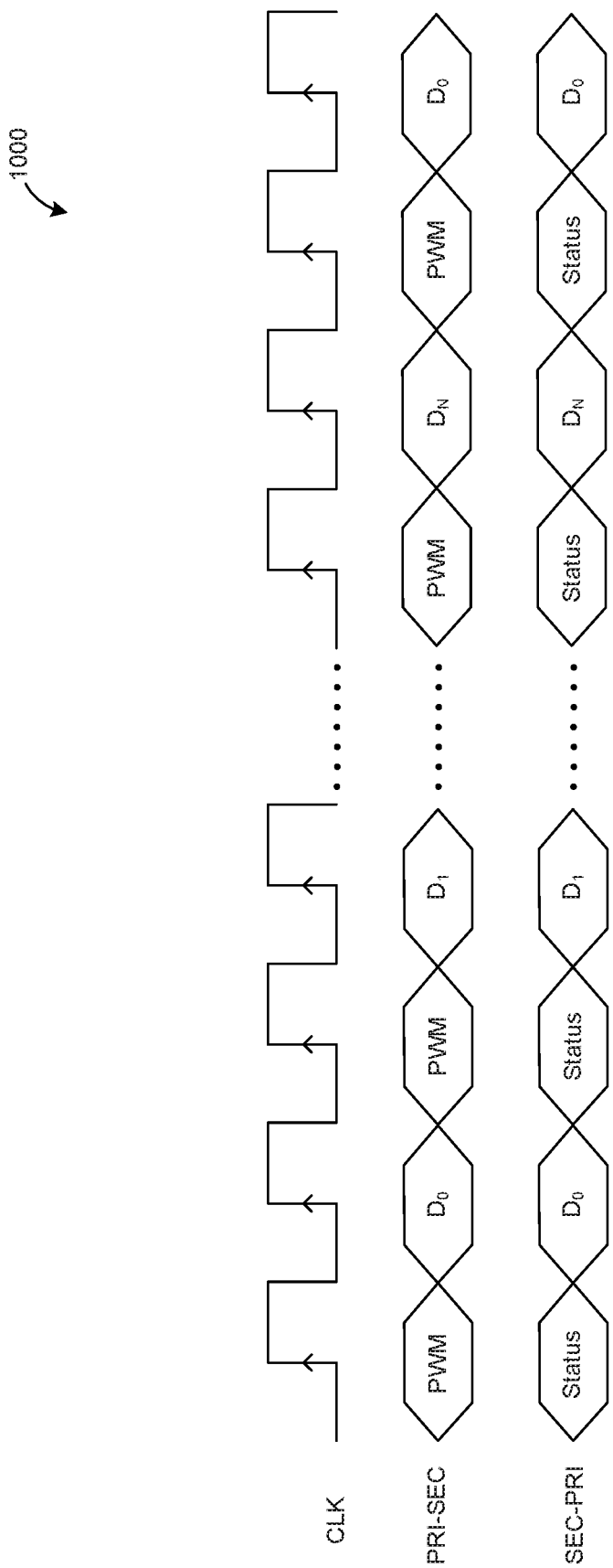
FIG. 10 is a timing diagram illustrating operation of the gate driver control circuit of FIG. 9.

FIG. 9 is a schematic block diagram of a gate driver control circuit 900 that can include a data communication device, such as a data communication devices that is implemented using the approaches described herein. FIG. 10 is a timing diagram 1000 illustrating operation of the gate driver control circuit of FIG. 9. Accordingly, the gate driver control circuit 900 of FIG. 9 and the timing diagram 1000 of FIG. 10 are described together in the following discussion.

The circuit 900 is an example application and use of multi-channel bi-directional data communication over multiple unidirectional galvanically isolated channels, such as using the circuits, devices and methods described herein. The circuit 900 can, accordingly, be used to communicate (between galvanically isolated power domains) control information (e.g., pulse width modulation control), feedback for run-time performance improvement, analytics and diagnostics a gate driver, such as an IGBT gate driver.

As shown in FIG. 9, the circuit 900 includes capacitors 912, 914, 916 and 918, which can implement differential isolation between a primary circuit 920 and a secondary circuit 930. The primary circuit 920 in the circuit 900 includes a TX 922, an RX 924, a serializer 950 and a deserializer 970, which can be implemented using the approaches described herein. The primary circuit 920 also includes a serial programmable interface (SPI) 927 and a primary digital state machine (DSM) 929. The primary DSM 929 can monitors fault, initiate and/or respond to handshake requests, and/or regulate start-up and operation of the primary circuit 920.

The secondary circuit 930 in the circuit 900 includes a TX 952, an RX 934, a serializer 990 and a deserializer 995, which can be implemented using the approaches described herein. The secondary circuit 930 also includes a SPI 937, and a secondary DSM 939. The secondary DSM 939 can provide driver status information. The SPI interfaces 927 and 937 can allow access to memory mapped registers, which can be used for configuring various driver parameters, configure test probes and read status and feedback data. The SPI interfaces 927 and 937 can also include error detection to reject corrupt data.

In such driver control applications, it is desirable to minimize latency for PWM control data (e.g., latency from the primary circuit 920 to the secondary circuit 930) and latency for driver status information (e.g., latency from the secondary circuit 930 to the primary circuit 920). Using serializer/deserializer frame formats as are shown in FIG. 10 for communication of data between the primary circuit 920 and the secondary circuit 930 can reduce latency, as compared to approaches that utilized a frame format in which all bits of an SPI are included in sequence in a serialized digital bit stream.

Referring to FIG. 10, a clock signal is shown for reference to illustrate sampling (rising edge sampling) of the primary-to-secondary bit stream (PRI-SEC) and the secondary-to-primary bit stream (SEC-PRI) of FIG. 10. As shown in the timing diagram 1000, the serializer 950 of the primary circuit 920 can be configured to interleave SPI data bits of the SPI 927 (e.g., data bits $D_0$ to $D_N$), in sequence, from data bit $D_0$ to data bit $D_N$, between PWM input control bits (PWM) from the primary DSM 929, which results in a one bit latency between PWM input control bits. Likewise, the serializer 990 of the secondary circuit 930 can be configured to interleave SPI data bits of the SPI 937 (e.g., data bits $D_0$ to $D_N$), in sequence, from data bit $D_0$ to data bit $D_N$, between driver status bits (STATUS) from the secondary DSM 939, which results in a one bit latency between driver status bits.

Additional elements of the driver control circuit 900 shown in FIG. 9 are, for purposes of brevity, not described in detail here. Also, while the primary circuits 920 and 920 of FIG. 9 are not illustrated as including an encoder and decoder, in some implementations, the primary circuit 920 and the secondary circuit 930 can each include an encoder and decoder that can be implemented using the approaches described herein.

FIG. 11 is a block diagram illustrating a clock recovery delay and delay calibration circuit (circuit) 1100. In some implementations, a delay of the circuit 1100 can be calibrated during a startup sequence of a data communication device, such as at state 740 of the state diagram 700 shown in FIG. 7. Accordingly, for purposes of illustration, the circuit 1100 is described below with further reference to FIG. 7.

As shown in FIG. 11, the circuit 1100 can include programmable delay blocks 1110, 1120 and 1130, and a D-type flip-flop (DFF) 1140. The delay blocks 1110-1140 of the circuit 1100 are illustrated as being 4-bit programmable delays. In some implementations, other programmable delay blocks can be used. The circuit 1100, e.g., during clock recovery delay calibration at state 740, can receive an input clock signal (e.g., a calibration signal received from a transmitting data communication circuit), which can be referred to as INPUT. While the calibration (INPUT) signal is being received, e.g., during a startup handshake sequence, such as between handshakes 2 and 3 discussed above, a 4 bit variable delay control signal (DELAY_CTRL) can be swept starting at 0, up to a maximum value of 15 (in this example).

For instance, DELAY_CTRL can be swept (incremented) until a calibration output (CAL_OUT) of the DFF 1140 is logic 0. In the circuit 1100, CAL_OUT is an output of the DFF 1140. The DFF 1140, in this example, can sample the received INPUT clock signal with a delayed clock (e.g., a delay clock output by the delay block 1120). Accordingly, the output of the DFF 1140 will transition from logic 1 to logic 0 when a delay of each of the delay blocks 1100-1130 is equal to one-quarter of a period of the calibration clock signal (e.g., resulting in a delay at the output of the delay block 1120 being one-half the period of INPUT, and producing an inverted version of INPUT at the output of delay block 1120).

The three matched delays of the delay block 1110-1130 (e.g., each being one-quarter of a period of INPUT) can then produce an overall delay that is three-quarters of the period of INPUT. That overall delay (of delay block 1110-1130) can then be used (e.g., during normal operation of an associated data communication device) to recover a clock signal (e.g., as OUTPUT of the circuit 1110) when decoding a Manchester encoded signal, such as using the decoder 680 of FIG. 6.

The various apparatus and techniques described herein may be implemented using various semiconductor processing and/or packaging techniques. Some embodiments may be implemented using various types of semiconductor processing techniques associated with semiconductor substrates including, but not limited to, for example, Silicon (Si), Gallium Arsenide (GaAs), Silicon Carbide (SiC), and/or so forth.

It will also be understood that when an element, such as a layer, a region, or a substrate, is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element or layer, there are no intervening elements or layers present.

Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. Any portion of the apparatus and/or methods described herein may be combined in any combination, except mutually exclusive combinations.

What is claimed is:

1. A data communication circuit comprising:
   a differential transmitter configured to transmit a first digital bit stream via a first differential unidirectional isolation channel;
   a differential receiver configured to receive a second digital bit stream via a second differential unidirectional isolation channel, the first differential unidirectional isolation channel and the second differential unidirectional isolation channel being defined on a common dielectric substrate; and
   a crosstalk suppression circuit being configured to provide:
      via a first adjustable capacitance circuit, a first negative feedback signal applied between a positive output terminal of the differential transmitter and a negative input terminal of the differential receiver; and
      via a second adjustable capacitance circuit, a second negative feedback signal applied between a negative output terminal of the differential transmitter and a positive input terminal of the differential receiver,
      the first negative feedback signal and the second negative feedback signal being configured to suppress crosstalk between the differential transmitter and the differential receiver due to parasitic capacitive coupling between the first differential unidirectional isolation channel and the second differential unidirectional isolation channel in the common dielectric substrate,
   the data communication circuit being configured to adjust respective capacitances of the first adjustable capacitance circuit and the second adjustable capacitance circuit based on a calibration signal, the calibration signal providing an indication of the parasitic capacitive coupling between the first differential unidirectional isolation channel and the second differential unidirectional isolation channel.

2. The data communication circuit of claim 1, wherein the differential receiver includes an LC resonant circuit having a corner frequency, the LC resonant circuit being configured to attenuate signals with frequencies below the corner frequency.

3. The data communication circuit of claim 1, wherein the differential transmitter is configured to transmit the first digital bit stream using an On/Off keyed radio-frequency carrier signal.

4. The data communication circuit of claim 1, wherein the second digital bit stream is an On/Off keyed radio-frequency signal, the differential receiver including:
   a full-wave rectifier configured to detect an envelope of the On/Off keyed radio-frequency signal; and
   a comparator configured to convert the detected envelope to a baseband digital bit stream.

5. The data communication circuit of claim 1, further comprising an encoder coupled with the differential transmitter, the encoder being configured to provide a Manchester-encoded baseband digital bit stream to the differential transmitter for transmission as the first digital bit stream.

6. The data communication circuit of claim 1, wherein the differential receiver includes a comparator,
   a threshold of the comparator being adjustable based on a clock signal received via the second differential unidirectional isolation channel.

7. The data communication circuit of claim 4, wherein:
   the comparator includes a Schmitt trigger; and
   the data communication circuit is configured to calibrate a threshold of the Schmitt trigger to an average amplitude of a 50 percent duty cycle square wave envelope detection signal produced by the full-wave rectifier.

8. The data communication circuit of claim 4, wherein the baseband digital bit stream is an encoded digital bit stream, the data communication circuit further comprising:
   a decoder configured to:
      recover a clock signal from the encoded digital bit stream, the clock signal being recovered using a delay that is proportional to a period of the clock signal; and
      decode the encoded digital bit stream using the recovered clock signal to produce a decoded digital bit stream.

9. The data communication circuit of claim 5, further comprising a serial programmable interface (SPI) coupled with the encoder, the Manchester-encoded baseband digital bit stream including one of:
   data bits provided by the SPI sequentially interleaved with gate driver control bits;
   data bits provided by the SPI sequentially interleaved with gate driver status bits.

10. The data communication circuit of claim 6, wherein the differential receiver includes:
    a full-wave rectifier configured to detect an envelope of a differential On/Off keyed radio-frequency signal received via the second differential unidirectional isolation channel, the full-wave rectifier and the comparator of the differential receiver being configured to convert the differential On/Off keyed radio-frequency signal to a baseband digital bit stream.

11. The data communication circuit of claim 8, wherein the decoded digital bit stream is a serialized digital bit stream, the data communication circuit further comprising:
    a deserializer configured to, using the recovered clock signal, deserialize the serialized digital bit stream to a plurality of output bits.

12. The data communication circuit of claim 8, wherein the delay is determined from a 50 percent duty cycle square wave envelope detection signal produced by the full-wave rectifier.

13. The data communication circuit of claim 10, wherein the baseband digital bit stream is an encoded digital bit stream, the data communication circuit further comprising:
    a decoder coupled with the differential receiver, the decoder being configured to:
       recover a clock signal from the encoded digital bit stream, the recovered clock signal being recovered using a delay that is proportional to a period of the clock signal; and
       decode the encoded digital bit stream using the recovered clock signal to produce a decoded digital bit stream.

14. A method comprising:
    adjusting, by a first data communication circuit, a capacitance of a first crosstalk suppression circuit included in the first data communication circuit, the first crosstalk suppression circuit being configured to suppress crosstalk between a transmitter and a receiver of the first data communication circuit;

in response to determining that adjustment of the capacitance of the first crosstalk suppression circuit has been completed, adjusting, by a second data communication circuit, a capacitance of a second crosstalk suppression circuit included in the second data communication circuit, the second crosstalk suppression circuit being configured to suppress crosstalk between a transmitter and a receiver of the second data communication circuit; and after completing adjustment of the capacitance of the second crosstalk suppression circuit:
  providing a first calibration signal from the first data communication circuit to the second data communication circuit, the first calibration signal being based on a clock signal of the first data communication circuit;
  providing a second calibration signal from the second data communication circuit to the first data communication circuit, the second calibration signal being based on a clock signal of the first data communication circuit;
  determining, by the first data communication circuit, based on the second calibration signal:
    a threshold of a comparator included in the receiver of the first data communication circuit; and
    a clock recovery delay for a decoder of the first data communication circuit; and
  determining, by the second data communication circuit, based on the first calibration signal:
    a threshold of a comparator included in the receiver of the second data communication circuit; and
    a clock recovery delay for a decoder of the second data communication circuit.

15. The method of claim 14, wherein:

adjustment of the capacitance of the first crosstalk suppression circuit and adjustment of the capacitance of the second crosstalk suppression circuit are performed in response to a first handshake request and response between the first data communication circuit and the second data communication circuit;

providing the first calibration signal and providing the second calibration signal are performed in response to a second handshake request and response between the first data communication circuit and the second data communication circuit.

16. The method of claim 14, further comprising after a startup process of the first data communication circuit, asserting a fault condition if the receiver of the first data communication circuit does not detect an incoming signal.

17. The method of claim 15, wherein occurrence of a fault condition in the first data communication circuit or the second data communication circuit causes the first data communication circuit and the second data communication circuit to repeat at least one of the first handshake request and response or the second handshake request and response.

* * * * *